US006440309B1

(12) United States Patent
Cohen

(10) Patent No.: US 6,440,309 B1
(45) Date of Patent: Aug. 27, 2002

(54) CERAMIC-SUPPORTED POLYMER (CSP) PERVAPORATION MEMBRANE

(76) Inventor: Yoram Cohen, 2625 S. Westgate Ave., Los Angeles, CA (US) 90064

( * ) Notice: Subject to any disclaimer, the term of this patent is extended or adjusted under 35 U.S.C. 154(b) by 0 days.

(21) Appl. No.: 09/573,599

(22) Filed: May 17, 2000

(51) Int. Cl.$^7$ ................................................ B01D 61/36
(52) U.S. Cl. .................. 210/640; 210/490; 210/500.42; 210/500.27; 96/4; 95/45
(58) Field of Search ................................. 210/640, 490, 210/500.27, 500.42; 96/6; 95/45

(56) References Cited

U.S. PATENT DOCUMENTS

| | | | |
|---|---|---|---|
| 3,796,314 A | * | 3/1974 | Kolek |
| 4,728,431 A | * | 3/1988 | Nagura et al. |
| 4,806,189 A | * | 2/1989 | Kraus et al. |
| 4,915,834 A | | 4/1990 | Bruchke |
| 4,950,635 A | * | 8/1990 | Williams et al. |
| 5,035,803 A | | 7/1991 | Cohen et al. |
| 5,066,398 A | | 11/1991 | Soria et al. |
| 5,110,784 A | * | 5/1992 | Willimans et al. |
| 5,141,649 A | | 8/1992 | Pasternak et al. |
| 5,171,449 A | | 12/1992 | Pasternak et al. |
| 5,205,934 A | * | 4/1993 | Linder et al. |

OTHER PUBLICATIONS

Ding, Hongbing and E. L. Cussler, Fractional Extraction with Hollow Fibers with Hydrogel–Filled Walls, AlChE J., 37, N6 (1991) 855–862.

Charpin, J., A. J. Burggraf and L. Cot, A Survey of Ceramic Membranes for Separations in Liquid and Gaseous Media, Ind. Ceram., 11 (1991) 84.

Goldman, M., D. Fraenkel and G. Levin, A Zeolite/Polymer Membrane for Separation of Ethanol–Water Azeotrope, J. Appl. Polymer Sci., 37 (1989) 1791–1800.

Hautojärvi, J., K. Kontturi, J. H. Näsman, B. L. Svarfvar, P. Viinikka, and M. Vuoristo, Characterization of Graft–Modified Porous Polymer Membranes, Ind. Eng. Chem. Res., 35 (1996) 450–457.

Kitao, S. and M. Asaeda, Separation of Organic Acid/Water Mixtures by Thin Porous Silica Membrane, J. Chemical Engineering of Japan, 23, N3 (1990) 367–370.

Rezac, M. E. and W. J. Koros, Preparation of Polymer–Ceramic Composite Membranes with Thin Defect–Free Separating Layers, J. Appl. Polymer Sci., 46 (1992) 1927–1938.

Sakohara, S.; F. Muramoto; T. Sakata and M. Asaeda, Separation of Acetone/Water Mixture by Thin Acrylamide Gel Membrane Prepared in Pores of Thin Ceramic Membrane, J. Chemical Engineering of Japan, 23, N1 (1990) 40–45.

Song, K. M. and W. H. Hong, Dehydration of Ethanol and Isopropanol Using Tubular Type Cellulose Acetate Membrane with Ceramic Support in Pervaporation Process, J. Membrane Sci., 123 (1997) 27–33.

Ulutan, S and T. Nakagawa, Separability of Ethanol and Water Mixtures through PTMSP–Silica Membranes in Pervaporation, J. Membrane Sci., 143 (1998) 275–284.

Van Gemert, R. W. and F. P. Cuperus, Newly Developed Ceramic Membranes for Dehydration and Separation of Organic Mixtures by Pervaporation, J. Membrane Sci., 105 (1995) 287–291.

Zhu, Y. R. G. Minet and T. T. Tsotsis, A Continuous Pervaporation Membrane Reactor for the Study of Esterification Reactions Using A Composite Polymeric/Ceramic Membrane, Chem. Eng. Sci., 51, No. 17, (1996) 4103–41.

Zhu, Y. and H. Chen, Pervaporation Separation and Pervaporation–Esterification Coupling Using Crosslinked PVA Composite Catalytic Membranes on Porous Ceramic Plate, J. Membrane Sci., 138 (1998) 123–134.

* cited by examiner

*Primary Examiner*—Ana Fortuna

(57) ABSTRACT

A ceramic-supported polymer membrane is disclosed where a porous ceramic membrane support of average pore size no larger than 500 Å is activated by attaching a vinyl terminated lower alkoxy silane to the surface of the ceramic membrane pores. The resulting membrane retains at least 10 micromoles of the vinyl terminated loweralkoxy silane per square meter of the ceramic membrane surface. A method for optimizing the amount of vinyl loweralkoxy silane reacted with the ceramic support surface is also disclosed. The large amount of vinyl terminated loweralkoxy silane which is chemically bonded to the surface of the ceramic porous support produces activated ceramic membrane support surface which is useful for graft polymerization of vinyl monomers onto the porous ceramic membrane support surface. A vinyl monomer is then graft polymerized onto the activated membrane. The resulting ceramic-supported polymer membrane is useful for pervaporation separation of liquids mixtures that are sufficiently different in their vapor pressure.

4 Claims, No Drawings

CERAMIC-SUPPORTED POLYMER (CSP) PERVAPORATION MEMBRANE

BACKGROUND OF THE INVENTION

It is suggested in the art that separation of liquid mixtures is feasible by the process of pervaporation. Pervaporation is a separation process whereby a liquid mixture is separated based on the preferred solubility and diffusivity of the components of the mixture through an active polymer membrane phase. On the permeate side of the membrane the partial vapor pressure of the species to be removed is maintained at a level much lower than its value under ambient conditions by maintaining vacuum or using a sweep gas (for example, air or nitrogen). The permeating species undergo a phase change (from liquid to vapor) as they diffuse through the membrane and the permeating species are condensed in a cold trap. The process of pervaporation can be used effectively to separate mixtures of close-boiling point components and it is suitable for the removal of volatile compounds from aqueous as well as organic liquid mixtures. Application of pervaporation technology include dehydration of alcohol-water streams, removal of organic pollutants from dilute aqueous wastes, and separation of close boiling point mixtures and isotropic mixtures.

To date, most pervaporation studies have involved pure or asymmetric composite polymer membranes. Well-documented drawbacks of polymeric pervaporation membranes include lack of physical stability and chemical vulnerability to various industrial solvents. Conversely, ceramic membranes are known to have excellent structural integrity and high chemical and thermal resistance (Charpin, et al., 1991). The benefits of ceramic membranes are largely offset by poor selectivity and a limited selection of pore sizes. Such shortcomings are overcome in my invention by surface modification of the ceramic substrate with grafted polymer chains, forming an asymmetric covalently-bonded polymer surface layer. This thin polymer layer provides the desired chemical selectivity and allows controlled reduction of pore size near the membrane surface. The resulting grafted asymmetric ceramic-supported polymer (CSP) membrane possess polymer layer stability far superior to membranes which are simply coated or pore-filled with a polymer phase (Sakohara, et al., 1990).

Polymer modification methods of membranes include the filling of porous polymeric membranes with a gel, made consisting of cross-linked polyvinyl alcohol, for use in fractional liquid extraction [Hongbing, D. and E. L. Cussler, Fractional Extraction with Hollow Fibers with Hydrogel-Filled Walls, *AICHE J.,* 37, N6 (1991) 855–862.] The membrane proposed by Hongbing and Cussler is different from the present invention because it deals with a polymeric membrane and the modifying polymeric gel is not chemically bonded to surface of the membrane.

Modification of a ceramic membrane by solution coating of preformed polymer was reported by Rezac and Koros [Rezac, M. E. and W. J. Koros, Preparation of Polymer-Ceramic Composite Membranes with Thin Defect-Free Separating Layers, *J. Appl. Polymer Sci.,* 46 (1992) 1927–1938.]. Polymer-ceramic composite membranes were prepared by solution deposition of a thin selective polymer layer onto a microporous ceramic support. This membrane was formed by physical adsorption of pre-formed polymer onto the surface of the membrane. Thus, the polymeric phase is not a stable phase, thus polymer attrition will occur upon exposure to a good solvent. The present invention, in contrast, consists of a ceramic membrane support with polymeric chains chemically attached to the ceramic support.

Another example of a polymer-coated membrane was reported by Song and Hong [Song, K. M. and W. H. Hong, Dehydration of Ethanol and Isopropanol Using Tubular Type Cellulose Acetate Membrane with Ceramic Support in Pervaporation Process, *J. Membrane Sci.,* 123 (1997) 27–33.] for the dehydration of isopropanol. A tubular-type cellulose-acetate membrane was formed on either the inner or outer surfaces of a porous ceramic support by the dip-coating and a rotation-drying technique. The Song and Hong membrane consists of a ceramic support physically-coated with a dense polymeric phase. Such a membrane will be unstable when exposed to high concentrations of the permeating species or good solvent for the polymer. In contrast, the present invention consists of a polymeric phase which is covalently bonded to the ceramic surface.

Another example of a polymer-coated membrane was reported by Song and Hong [Song, K. M. and W. H. Hong, Dehydration of Ethanol and Isopropanol Using Tubular Type Cellulose Acetate Membrane with Ceramic Support in Pervaporation Process, *J. Membrane Sci.,* 123 (1997) 27–33.] for the dehydration of isopropanol. A tubular-type cellulose-acetate membrane was formed on either the inner or outer surfaces of a porous ceramic support by the dip-coating and a rotation-drying technique. The Song and Hong membrane consists of a ceramic support physically-coated with a dense polymeric phase. Such a membrane will be unstable when exposed to high concentrations of the permeating species or good solvent for the polymer. In contrast, the present invention consists of a polymeric phase which is covalently bonded to the ceramic surface.

A polymer-coated ceramic membrane for pervaporation was also proposed by Zhu et al. [Zhu, Y. R. G. Minet and T. T. Tsotsis, A Continuous Pervaporation Membrane Reactor for the Study of Esterification Reactions Using A Composite Polymeric/Ceramic Membrane, *Chem. Eng. Sci.,* 51, No. 17, (1996) 4103–41]. The membrane was prepared by dip-coating a γ-Alumina ceramic support tube with polyetherimide solution. The membrane is intended for in situ water removal from reaction systems. In this membrane the polymeric phase is physically coated onto the ceramic support. As a result, such a membrane has a short life-time due to polymer attrition when subjected to good solvent conditions. Such a membrane cannot be effectively used for organic-organic separations. In a later study Zhu and Chen [Zhu, Y. and H. Chen, Pervaporation Separation and Pervaporation-Esterification Coupling Using Crosslinked PVA Composite Catalytic Membranes on Porous Ceramic Plate, *J. Membrane Sci.,* 138 (1998) 123–134.] reported on a pervaporation membrane prepared by crosslinking a PVA dense active layer was coated on the porous ceramic plate. Then, $Zr(SO_4)_2 \cdot 4H_2O$, an inorganic solid acid which was used as the esterification catalyst in the experiment, was immobilized on the dense active layer. This membrane belongs to the class of coated polymeric membranes with cross-linking to improve membrane stability. However, the polymeric phase is not chemically attached to the porous ceramic support. In contrast, in the present invention the polymeric phase is chemically attached to the support surface.

Another example of a polymer-ceramic composite pervaporation membrane was proposed by Goldman et al. [Goldman, M., D. Fraenkel and G. Levin, A Zeolite/Polymer Membrane for Separation of Ethanol-Water Azeotrope, *J. Appl. Polymer Sci.,* 37 (1989) 1791–1800.] who added a fine zeolite to a solution of dissolved poly(vinyl chloride), with the final membrane formed by subsequent casting of the mixture followed by a drying step. The membrane was used for ethanol/water azeotropic pervaporation. The above membrane differs from the present invention in that it deals with a powdered ceramic dispersed in a polymeric phase. In contrast, the present invention is a ceramic membrane with a polymeric phase of single chains chemically bonded to the ceramic membrane surface.

A ceramic membrane modified by pore-filling with acrylamide-based polymer was reported by Sakohara et al. [Sakohara, S.: F. Muramoto; T. Sakata and M. Asaeda, Separation of Acetone/Water Mixture by Thin Acrylamide Gel Membrane Prepared in Pores of Thin Ceramic Membrane, J. Chemical Engineering of Japan, 23, N1 (1990) 40–45.] A thin polyacrylamide gel membrane was formed within the pores of a thin porous ceramic membrane of silica-alumina by copolymerizing acrylamide type monomer and N,N'-methylene-bis(acrylamide) as a crosslinking agent. This membrane consists of a gel phase which is physically held in the pores of the ceramic silica-alumina membrane. In contrast, the present invention consists of a ceramic support membrane with a layer of terminally and covalently bonded polymer chains. Therefore, the present invention does not suffer from instability caused by exposure to good solvents, or at elevated temperatures above the glass transition temperature of the polymer phase.

Hautojärvi et al [Hautojärvi, J., K. Kontturi, J. H. Näsman, B. L. Svarfvar, P. Viinikka, and M. Vuoristo, Characterization of Graft-Modified Porous Polymer Membranes, Ind. Eng. Chem. Res., 35 (1996) 450–457.] modified porous poly(vinylidene fluoride) membranes via radiation-induced grafting of acrylic acid. When the grafted membranes were characterized by measurements of convective permeability, diffusion and ion exchange properties, they showed variable membrane permeability with respect to the solvent and also ionic semi-permeability. The present invention is different from the above membrane in two ways. First, the present membrane is a modified ceramic membrane (and not a polymeric support membrane). Second, the present surface modification is based on liquid-phase free-radical graft polymerization whereas the above process requires radiation-induced grafting.

A strictly ceramic pervaporation membrane was developed by Van Gemert and Cuperus [Van Gemert, R. W. and F. P. Cuperus, Newly Developed Ceramic Membranes for Dehydration and Separation of Organic Mixtures by Pervaporation, J. Membrane Sci., 105 (1995) 287–291]. In their approach γ-Alumina was used as the membrane support onto which silica is deposited as a dense top layer by the sol-gel technique. The resulting membrane was tested for methanol, ethanol and 2-propanol dehydration by pervaporation. This membrane is a purely ceramic membrane, whereas the present invention is a hybrid ceramic-polymer membrane consisting of a ceramic porous support with a chemically-bonded polymeric surface phase.

Modification of a silica membrane for organic/aqueous pervaporation was reported by Kitao and Aseda [Kitao, S. and M. Asaeda, Separation of Organic Acid/Water Mixtures by Thin Porous Silica Membrane, J. Chemical Engineering of Japan, 23, N3 (1990) 367–370. ] A thin porous silica membrane was formed at the surface of an α-alumina substrate by dipping in an inorganic silica sol-gel mixture. The solution was prepared by hydrolyzing tetraethoxysilane with a small amount of nitric acid. The above membrane is a silica membrane whereas the present invention is a ceramic membrane onto which a modifying organic polymeric phase is covalently attached via graft polymerization.

An approach where a membrane is prepared from a mixture of silica particles dispersed in a casting polymer solution was reported by Ulutan and Nakagawa [Ulutan, S and T. Nakagawa, Separability of Ethanol and Water Mixtures through PTMSP-Silica Membranes in Pervaporation, J. Membrane Sci., 143 (1998) 275–284.] Asymmetric poly [1-(trimethylsilyl)-1-propyne] composite membranes having silica on one side were prepared by mixing silica particles with a polymer casting solution. The higher density of the silica during casting caused the formation of a silica enriched membrane surface. The above approach is based on depositing a suspension of silica particles and organo-silane to form a dense membrane surface. The present invention is different since it does not require a mixture of silica particles and a pre-formed polymer which are casted from solution. The present invention is a surface modification method whereas the Ulutan and Nakagawa membrane process is a bulk-casting process.

Pasternak and Kokturk [Pasternak, M. and U. Kokturk, Membrane and Method of Separation, U.S. Pat. No. 5,171,449, Dec. 15, 1992] disclosed the details of membrane prepared with non-porous membrane separating layer of cross-linked polyvinyl alcohol cast on a porous alumina ceramic support. Organic nitrogen compounds (i.e. ethylene diamine) may be separated by this pervaporation membrane. This membrane differs from my proposed invention because the polymer layer is coated on the ceramic support and then crosslinked. Thus, the active polymer phase is not chemically bonded to the support, unlike my invention in which the polymer is chemically grafted onto the membrane surface. A similar approach by Pasternak et al. [Pasternak, M., U. Kokturk, M. S. Najjar and R. D. Malouf, Novel Membrane and Method of Separation, U.S. Pat. No. 5,141,649, Aug. 25, 1992] reported that aqueous mixtures of organic oxygenates may be separated by pervaporation through a membrane assembly containing a porous ceramic substrate which supports a separating layer of cured polyvinyl alcohol which has been cross-linked with glutaraldehyde. This membrane differs from the proposed invention in that the polymer layer is coated on the ceramic support and then crosslinked. Unlike my invention, Pasternak et al. membrane lacks the chemical bonding between polymer and the support.

The use of polyphosphazene as the active membrane phase was reported by Soria et al. [Soria, R. C. Defalque and J. Gillot, Membrane for a Filtration, Gas or Liquid Separation or Pervaporation Apparatus and a Manufacturing Method for such Membrane, U.S. Pat. No. 5,066,398, Nov. 19, 1991]. In the approach of Soria et al., a membrane for filtration, gas or liquid separation or pervaporation apparatus was formed from at least one porous layer of an inorganic material selected from sintered ceramic, sintered metal, sintered glass or carbon and a separating layer of organic material (polyphosphazene). The patent of Soria et al. does not overlap with the current invention because the claim only deals with polyphosphazene as a separating organic layer. Also, the patent claims specify that this polyphosphazene is dissolved in a solvent prior to application to the porous support, making it a polymer coating rather than a chemically grafted layer.

The coating of a polymeric membrane with a polymer phase for pervaporation application was disclosed by Bruchke [Bruchke, H., Multi-Layer Membrane and the Use Thereof for the Separation of Liquid Mixtures According to the Pervaporation, U.S. Pat. No. 4,915,834, Apr. 10, 1990.] The above patent describes a multi-layer membrane having a porous backing layer of polyacrylonitrile, polysulfone or the like, and an active separating layer of poly(vinyl alcohol) or cellulose acetate. The membrane is suitable for the separation of water-alcohol mixtures by pervaporation. This membrane differs from the proposed invention in that it claims an active polymer layer crosslinked onto a flat porous polymer support. In contrast, the proposed invention contains an active polymer layer chemically bonded to the surface of a ceramic support.

All of the articles cited above provide, to those skilled in the art, information about the preparation of modified ceramic and polymeric membranes by physical attachment of a polymer phase onto the membrane surface and/or filling the membrane pore completely or in part with a preformed polymer. There have also been studies that reported on polymer-based and ceramic-based membranes prepared by filling a support membrane pores with a monomer and polymerizing the monomer inside the pores. It is known in the art that polymer chains can be grafted onto the surface of polymeric support membranes. Various techniques for modifying polymeric membrane supports are known to those skilled in the art and therefore no detailed exemplification thereof will be given herein.

It is important to note that none of the articles or patents disclose or suggest that any of the authors have actually grafted a polymer onto the surface of a ceramic membrane. To date, ceramic membrane modification studies and patents have focused primarily on physical coating with a polymer layer and by the pore filling technology. The drawbacks of these polymeric/ceramic composite membranes include their lack of chemical resistance and thus longevity in demanding applications. All previous membrane modifications, in which the polymer phase is not chemically bonded to the support, suffer from the drawback that modifying polymer phases which are completely miscible in the liquid mixture to be separated or one of its ingredients cannot be used; cross-linking of the polymer phase is then required to impart mechanical stability to the membrane at the expense of reduced flux and selectivity. Drawbacks of polymeric-ceramic composite membranes in which the polymer phase is not chemically bonded to the support membrane also include their lack of thermal stability and poor chemical resistance to many solvent. In a good solvent or solvent mixture, the polymer phase can swell, detach from ceramic (or polymeric) support and thus result in loss of performance.

My invention overcomes the difficulties discussed above by creating a class of ceramic-supported polymer (CSP) membranes in which covalent bonding of polymer chains to the ceramic substrate results in stable membrane. In my invention the entire amount of polymer, which modifies the ceramic membrane support, is chemically grafted onto the membrane surface as well as the membrane internal pore surface. The CSP membranes have an important advantage in that a variety of different polymers can be graft polymerized onto the surface of the membrane. Finally, the active membrane phase is essentially a single macromolecular layer keeping membrane resistance at a minimum. The chemically bonded polymer phase is useful in converting a ceramic porous membrane support into a membrane capable of separating mixtures of organic compounds from liquid solutions by pervaporation. The chemically bonded polymer phase is stable and the membrane retains its effectiveness even under conditions that result in swelling of the chemically grafted polymeric phase.

SUMMARY OF THE INVENTION

The present invention is predicated upon a number of surprising findings. First, using the method of the present invention, ceramic support membranes or filters having surface hydroxy group can be surface activated with vinyl loweralkoxy silane. It should be noted that when I refer to a vinyl lower alkoxysilane I mean a compound having the following formula:

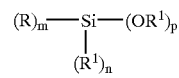

wherein R is an organic group, $R^1$ is an organic group containing at least one vinyl functional group, $R^2$ is lower alkyl, m is 0, 1 or 2, n is 1 to 3, p is 1 to 3 and the sum of m, n and p is 4. It is preferred if $R^1$ is a loweralkylene (e.g., alkyl) which may contain oxygen (e.g., lower alkyl oxide). It is also preferred if R is a lower alkyl or oxygen or chlorine containing alkyl. Since vinyl loweralkoxy silanes are well known in the art, no detail exemplification thereof will be given. Examples of vinyl loweralkoxy silanes include diallyl dimethoxy silane, allyl triethoxy silane, ethyl vinyl dimethoxy silane, divinyl diethoxy silane and, preferably vinyl triethoxy silane and vinyl trimethoxy silane.

Prior to chemically bonding the vinyl loweralkoxy silane to the membrane support surface, the membrane surface is exposed to an atmosphere of controlled humidity in order to maximize the surface yield of the chemically bonded vinyl loweralkoxy silane. The surface yield of chemically bonded loweralkoxy silane displays a maximum with respect to the surface water content of the ceramic membrane support. For a silica substrate, for example, surface coverage by vinyltrimethoxy silane as high as 80 micromoles per square meters of silica surface can be obtained at water surface coverage equivalent to about 2 monolayers of water. For zirconium oxide and α-alumina surfaces, coverages of up to about 23 and 40 micromoles of vinyltrimethoxy silane per square meter of the support surface, respectively, can be achieved corresponding to surface water content equivalent to 3 and 15 water monolayers for the zirconium oxide and α-alumina substrates, respectively. Subsequent modification of the surface of the ceramic support with water insoluble polymers does not require any additional surface treatment. However, for subsequent modification of the ceramic support surface with water soluble polymers which are graft polymerized onto the surface in an aqueous mixture, the loweralkoxy groups are hydrolyzed to produce a surface with restored wettability, thereby allowing for high graft polymerization yield on the surface when utilizing water soluble vinyl monomers.

The ceramic porous supports used as the membrane support in the present invention are well known in the art and therefore no detailed exemplification thereof will be given herein. Such ceramic support membranes or filters will have surface hydroxyl groups for chemically bonding the vinyl loweralkoxy silane to the surface of the ceramic membrane. Generally speaking, the membrane support can consist of silica, zirconia, alumina, or any other inorganic oxide support whose surface possesses surface hydroxyls or a surface that can be hydrolyzed to create surface hydroxyls. These surface hydroxyls provide the active sites for chemically anchoring vinyl-silane molecules. The preferred vinyl activators are vinyl loweralkoxy silanes. The starting pore size of the ceramic support membrane that can be used will vary but in general will be from about 20 Angstroms to 500 Angstroms. The geometry of the porous ceramic support can be in a circular disk form, rectangular, tubular or multichannel array. The ceramic membrane support can be either homogenous (i.e., the entire support is made of the same material and of the same pore size) or asymmetric. An asymmetric porous ceramic support can consist of a thin or thick ceramic layer with small pores on top of an underlying ceramic support with larger pores. The said thin ceramic support (which I refer to as "porous ceramic membrane support") can exist on either side or both sides of the supporting larger pore ceramic support layer. At present, commercially available ceramic support membranes have porosities (i.e., pore volume fraction) that are about 30% or higher. In general, it is preferred to utilize ceramic membrane support with a porosity (i.e., void fraction) equivalent to 30% or higher.

As noted previously, the compound used to activate the surface of the porous ceramic membrane support is a vinyl loweralkoxy silane. In order to achieve sufficiently high surface coverage (i.e., so that said vinyl lower alkoxysilane covers the surface of the ceramic membrane support, in an amount of at least 10 micromoles of vinyl silane per square meter of said ceramic membrane support surface). I discovered that it is necessary to optimize the surface moisture of the ceramic material (prior to its modification with the vinyl loweralkoxy silane) in order to maximize the amount of vinyl lowralkoxy silane which is chemically bonded to the support surface. For example, as noted earlier, the optimal surface water coverage (prior to the silylation reaction with the vinyl loweralkoxy silane) is about 2–4 equivalent water monolayers for a silica substrate, about 3 water monolayers for a zirconia substrate and about 15 water monolayers for an α-alumina substrate. Also, for the chemical bonding of the vinyl loweralkoxy silane, it is necessary to utilize as a solvent, lower alkyl benzene such as toluene, phenylpropane, ortho, meta or parazylene, etc. When using this type of solvent, high surface coverage of the ceramic surface is achieved by the vinyl loweralkoxy silane, such yields being, from about 10 micromoles per square meter to as high as 80 micromoles per square meter of the ceramic membrane support.

The temperature of the silylation reaction is not critical; however, higher temperature increases the speed of the reaction. Generally speaking the reaction can be carried out up to the boiling point of the solvent abut it is preferred that the reaction is above the boiling point of the lower alkyl alcohol formed by the reaction. For example, if xylene and vinyl trimethoxy silane are used, the preferred range would be between about 80° C. and 137° C.

The resulting surface vinyl groups are the active sites from which polymer molecules are grown. The ceramic substrate provides the required mechanical support-frame while the chemically anchored polymeric phase is used to control pore size and pore surface chemistry, thereby imparting chemical selectivity to the CSP membrane.

The silylation reaction is achieved by contacting the membrane surface with the solution of lower alkyl benzene and vinyl loweralkoxy silane. The reservoir for the feed solution is fitted with a reflux condenser and the mixture is heated above the boiling point of the thus produced alcohol but slightly below or at the boiling point of the solvent. The reflux condenser is so arranged that the displaced alcohol is removed but the vapors of the vinyl loweralkoxy silane and lower alkyl benzene are condensed and returned to the reaction mixture. For tubular membranes, the surface of the membrane on tube-side and/or the outside surface can be modified by contacting the membrane with the flowing solution in a standard housing module. Modification through the entire depth of the membrane is accomplished by pumping the solution through the tube-side of the tubular membrane under sufficient transmembrane pressure to allow for passage of the solution of vinyl loweralkoxy silane in the lower alkyl benzene solvent through the porous membrane support layer. Modification of the surface of flat sheet membranes or disk membranes is accomplished by immersing the membrane (being held in a stainless steel basket to prevent movement of the membrane) in the reaction solution for a prescribed period of time. After the membrane is chemically modified with an adequate amount of vinyl terminated loweralkoxy silane, the resulting surface activated membrane is washed with the lower alkyl benzene and allowed to dry.

Thereafter, if the membrane is to be graft polymerized with a water soluble polymer in an aqueous reaction mixture, the remaining unreacted lower alkoxy groups are hydrolyzed. Such hydrolysis can be accomplished in a number of different ways known to those skilled in the art. For example, the hydrolysis step may be performed by immersing the membrane in water to which a base has been added to adjust the pH to between about 8 and 12. A pH range of 8 to 10 is suitable for silica while pH as high as 10–12 is suitable for a zirconia-based membrane. The hydrolysis step may be performed under ambient temperature and the membrane is allowed to remain in the alkaline water for a sufficient period of time to complete the hydrolysis of the loweralkoxy groups (e.g. one to five days). After the hydrolysis step, the membrane is more hydrophilic as opposed to being more hydrophobic prior to the hydrolysis step. The base used for the hydrolysis may be any base either weak or strong, inorganic or organic. For example, basic compounds useful in the present invention include sodium hydroxide, calcium hydroxide, potassium hydroxide, etc.

Once the membrane surface has been modified, by chemically bonding onto the surface vinyl loweralkoxy silane in an amount of at least 10 micromoles per square meter, the membrane is then ready to be graft polymerized. Graft polymerization allows for chemically bonding the resulting vinyl polymer onto the activated membrane surface (either side of the membrane or throughout the membrane matrix). It should be noted that by "graft polymerization" I mean the growth of polymer chains from surface active sites (i.e, surface vinyl groups) by step or chain polymerization. This is to be distinguished from polymer grafting which involves the bonding of previously synthesized polymer chains from a bulk phase to the membrane support surface. Polymer grafting is not satisfactory in this invention because polymer molecules must diffuse to the solid surface and therefore diffusional limitations and steric hindrance severely reduce the degree of surface coverage and graft yield obtained. In complete contrast thereto, in graft polymerization, diffusional limitations and steric hindrance effects are substantially diminished due to the smaller size of the monomer molecules and therefore a higher surface concentration and a more uniform surface coverage is possible.

In general, any polymer which can be formed by the polymerization of vinyl monomers via addition polymerization can be utilized in the present invention. Vinyl monomers are well known in the art and include both water soluble and organic solvent soluble monomers. Water soluble polymers include but are not limited to acrylic acid, acrylamide, vinyl heterocyclic compounds such as vinyl pyridines and vinyl pyrrolidone such as N-vinylpyrrolidone. Other suitable vinyl monomers include but are not limited to styrene, vinyl acetate, methyl acrylate, acrylonitrile, methyl methacrylate. Although any one of several reactions methods, which are well known in the art, can be utilized for polymerization of vinyl monomers, the preferred polymerization is via free-radical polymerization due to the ability to synthesize polymers under relatively mild reaction temperatures.

When utilizing the surface activation method in the present invention, I obtain a surface coverage of the polymer in the range of about 1 to 6 milligram of polymer per square meter of ceramic support surface. Generally speaking, polymer surface coverage corresponding to about 2 milligram per square meter or higher are desired for effective pervaporation membranes when the initial membrane pore size is about 500 Angstrom or less. The graft polymerization is preferably performed in the absence of oxygen which is believed to lengthen the polymerization reaction time and result in a lower polymer graft yield. In as much as the preferred reaction is a typical free-radical reaction, it is necessary to have an initiator such as diazo compounds or a peroxide. Example of peroxides include hydrogen peroxide, t-butyl hydroperoxide, diacetyl peroxide. Other type of initiators that can be used include diazo compounds such as 1,4-dimethyl-valeronitrile, $\alpha,\alpha'$-azobis(isobutyronitrile) and azodisulfonic acid. The temperature of the reaction affects the speed of the reaction and may range from about 50° C. to about 90° C. Higher temperatures may be used as long as the temperature is not above the boiling point of any of the ingredients in the polymerization reaction mixture which is brought into contact with the ceramic membrane support. The rate of reaction is, to some extent, governed by the initial concentration of the vinyl monomer in the solution. For example, I have found that little as a 10% weight of the vinyl monomer in solution is satisfactory but higher initial vinyl monomer concentrations of up to about 40% may be used. The amount of polymer grafted onto the surface will typically increase with higher initial monomer concentrations. However, as well known in the art of polymerization, high viscosities, which result when polymerizing from a solution of a high initial monomer concentration (greater than about 30% by weight), can make it difficult to mix the reaction mixture and in the case of tubular membranes may also make it more difficult to circulate the reaction mixture through the membrane tube- or shell-side. Therefore, the optimal concentration has to be determined for each selected vinyl monomers. For example, I have found that initial vinyl monomer concentrations in the range of 10% up to 30% by weight are preferred.

The polymerization reaction time may also vary greatly depending on the temperature and the concentration of the vinyl monomer. Generally speaking, the reaction to obtain the desired graft yield will take from about two to ten hours.

The ceramic-supported polymer (CSP) membranes of the present invention are useful in a number of ways. First, they are excellent for separating volatile organic compounds from water. For example, alcohols such as methanol, ethanol, isopropanol, aromatic compounds such as benzene, toluene and xylenes, chlorinated compounds such as trichoroethylene, vinyl chloride, chloroform and ethers such as methyl-t-butyl ether can be separated from water using a pervaporation operation. The process of pervaporation is well known in the art and therefore no detailed exemplification thereof will be given herein. The permeating species (i.e., the compound to be removed from a solution mixture) has to have a greater solubility (or partitioning) in the grafted polymer relative to the solubility of the other components of the mixture. Generally speaking, chemicals which can be separated by the present invention are those which are attracted to the graft polymer on the ceramic membrane support. For example, when trichloroethylene is to be removed from water by pervaporation, poly(vinyl acetate) is a suitable polymer for the active membrane separation layer. In its pure form (i.e., not bonded to a surface) poly(vinyl acetate) is soluble in trichloroethylene while being completely insoluble in water. Selection of the appropriate polymer for a specific pervaporation task can be performed with a homopolymer (i.e., polymer not chemically bonded to a surface) using a variety of test methods well known in the art. It is emphasized that once the polymer is chemically bonded to the membrane support surface, it can swell with the chains extending away from the ceramic support surface but the polymer chains remain chemically attached to the support surface.

Separation by pervaporation can be carried out under ambient conditions but higher temperatures will results in a higher separation factor (concentration of target compound in the feed/concentration fo target compound in the recovered permeate). The flow of the feed solution past the membrane feed-side can also affect the separation factor. It is known in the art that, as the velocity of the feed increases, higher separation factors can be obtained. With the present invention enrichment factors, defined as the ratio of the target chemical concentration in the feed to its overall concentration in the collected permeate, are typically in the range of 100 to 400 at operating temperature of about 23° C. It is well known in the art of pervaporation that higher operating temperatures will result in higher enrichment factors. It is also known in the art that enrichment factors will increase by increasing the feed-side flow rate. Enrichment factors, as discovered in the present invention, will also increase with increasing polymer graft yield. For example, the separation of trichloroethylene from water using a tubular poly(vinyl acetate)-silica membrane with an inside diameter of 0.5 centimeters, 20 centimeters in length and a porous wall thickness of 0.5 millimeters would result in enrichment factors that can range from about 70 to 850 for a polymer graft yield ranging from about 1 to 3.5 milligram polymer per square meter of membrane support surface.

The present invention allows the attachment of a polymer phase covalently to ceramic support. Thus, the problem of loss of membrane stability due to swelling by the permeating species is avoided. The polymer layer can be created at varying degrees of surface density thus controlling the level separation.

Given below are presently preferred embodiments, which are set forth solely in order to full illustrate the invention, being understood that such examples are not to be considered limiting.

EXAMPLE 1

Conditioning of the Ceramic-support

In this step a silica membrane support, 20 centimeters long, outside diameter of 0.5 centimeters and porous wall thickness of 0.5 millimeters, was cleaned using water, mild sodium hydroxide or hydrochloric acid to clean and fully hydroxylate the surface (create surface hydroxyls necessary for chemically attaching loweralkoxy vinyl silane). Surface water coverage on the ceramic support was carefully controlled to achieve surface coverage equivalent to about 2 to 4 monolayers of water. Surface water coverage less than or greater than the above optimum will result in a lower than optimal coverage by vinyl groups following the silylation reaction. Surface water control was achieved by placing the ceramic membrane in a controlled humidity chamber until the weight of the porous ceramic membrane support (as determined gravimetrically) was unchanged at a value corresponding to above 3 monolayers of water. A similar treatment of a zirconia-based membrane (24 centimeter long, 0.6 centimeters inside diameter, average pore size of about 100 Angstroms and active zirconia layer of thickness about 2.5 micrometers) was conducted to obtain water surface coverage at a level of about 7 monolayers of water.

EXAMPLE 2

Production of Activated Ceramic Membrane Support

The membrane of Example 1 was modified with vinyl trimethoxy silane by exposing the surface of a porous silica-based membrane (inside and outside surface or both) to a solution of 10% weight solution of vinyl trimethoxy silane in xylene. The feed solution was pumped from a glass flask fitted with a condenser kept at a temperature above the boiling point of methanol but just below the boiling point of the solution. The approximate temperature used was 137° C. After five hours the membrane was removed from its housing module and washed several times with xylene and cured overnight at 50° C. to produce surface activated ceramic support having approximately 35 micromoles of vinyl trimethoxy silane per square meter of support surface. This was determined by gravimetric analysis. After the above modification, the membrane support, which had a native average pore size of about 500 Angstroms, became completely hydrophobic such that water permeation could not be detected (i.e., the membrane was water impermeable) up to a transmembrane pressure as high as 30 pounds per square inch. A similar treatment of the zirconia membrane of Example 1 resulted in a membrane with a vinyl trimethoxy silane coverage of about 14 micromoles per square meter of the zirconia support surface. The modified zirconia surface had a water permeability that was a factor of ten lower than that of the native membrane.

EXAMPLE 3

Hydrolysis of Alkoxy Groups

The zirconia membrane of Example 2 was hydrolyzed in order to convert the remaining alkoxy groups of the surface-bonded vinyl trimethoxy silane to hydroxy groups. Hydrolysis was accomplished by immersing the membrane in water adjusted to a pH of 10–12 by adding sodium hydroxide. The membrane was kept in the sodium hydroxide solution for a period of approximately three days. The hydrolysis step converts the alkoxy groups to hydroxyl groups which restores surface hydrophilicity. After hydrolysis the water permeability of the modified membrane was found to be about only 30 percent lower than the water permeability of the native zirconia membrane of Example 1.

EXAMPLE 4

Surface Graft Polymerization of Vinyl Acetate

The silylated silica membrane of Example 2 was modified by a free-radical polymerization of vinylpyrrolidone at a temperature of 55° C., initial monomer concentration of 40 percent by weight in ethyl acetate and using $\alpha,\alpha'$-azobis(2, 4-dimethylvaleronitrile) as the initiator. The modification resulted in a polymer surface phase consisting of chains which are covalently and terminally anchored to the ceramic substrate at a surface coverage of about 2.7 milligram poly(vinyl acetate) per square meter of membrane support surface). The membrane was subsequently washed with ethyl acetate to remove any physically adsorbed polymer. The resulting membrane was impermeable to water in water permeability tests with transmembrane pressures up to about 12 pounds per square inch.

EXAMPLE 5

Pervaporation Removal of Trichloroethylene and Methyl-t-butyl-ether from Water

A tubular silica-poly(vinyl acetate) membrane of Example 4 was used in a standard pervaporation separation apparatus with a permeate side vacuum of 2 torr to remove trichloroethylene (TCE) and Chloroform dissolved in water at concentrations up to 680 and 400 ppm, respectively. The permeate was collected having been enriched by a factor of about 70–180 relative to the feed solution. The recovered permeate consisted of a pure phase of the organic and an immiscible aqueous phase. A similar experiment with water containing 0.1 percent by weight methyl-t-butyl-ether resulted in a permeate enriched by a factor of 150–370 relative to the feed.

For both the removal of TCE and methyl-t-butyl-ether, treatment of a solution of 1 liter solution containing said organics in a closed loop (the solution from the tube-side of the membrane being returned to the feed reservoir but the enriched permeate removed) resulted in about 45 percent and 70 percent for the removal of trichloroethylene and methyl-t-butyl-ether, respectively.

What is claimed is:

1. A pervaporation membrane consisting essentially of a porous ceramic support of pore size 500 angstroms or less containing surface hydroxyls or having been hydrolyzed to create surface hydroxyls and having been treated to contain surface water in the amount equivalent of 2–24 monolayers of water, said surface having vinyl loweralkoxy silane or vinylhydroxy silane chemically attached to the external surface and/or pore surface in an amount of at least 10 micromoles of said vinyl loweralkoxy silane or vinyl hydroxysilane per square meter of said ceramic membrane, said surface activated ceramic support having graft polymerized onto the vinyl alkoxysilane or vinyl hydroxysilane a water insoluble or water soluble vinyl monomer, by free-radical graft polymerization, resulting in terminally and covalently bonded vinyl polymer in an amount of at least 2 milligram of said vinyl polymer per square meter of said ceramic membrane support surface.

2. A method for maximizing surface coverage of chemically bonded loweralkoxy vinyl silane or vinylhydroxy silane on a ceramic membrane support, the membrane support according to the pervaporation membrane of claim 1, wherein said membrane support containing surface hydroxyl, and the water content of said ceramic support is optimized by treating the support with the vinylalkoxy silane or vinylhydroxy silane and free-radical polymerization of vinyl monomers.

3. Ceramic-supported polymer membrane according to claim 1 wherein said grafted polymer formed by graft polymerization of poly(vinylacetate) or poly (vinylpyrrolidone).

4. A method for removing organic compounds from water, using a ceramic-supported polymer membrane prepared according to claim 3, by a pervaporation process, comprising of contacting said water having said organic compounds, at concentrations up to the solubility limit of said organics in water.

* * * * *